(12) United States Patent
Hartung

(10) Patent No.: US 6,477,555 B1
(45) Date of Patent: Nov. 5, 2002

(54) METHOD AND APPARATUS FOR PERFORMING RAPID CONVOLUTION

(75) Inventor: John Hartung, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/349,263

(22) Filed: Jul. 7, 1999

(51) Int. Cl.⁷ .............................................. G06F 17/10
(52) U.S. Cl. ..................................... 708/420; 708/607
(58) Field of Search ............................. 708/420, 607, 708/313, 315, 319, 322

(56) References Cited

U.S. PATENT DOCUMENTS

| | | | |
|---|---|---|---|
| 5,099,447 A | * 3/1992 | Myszewski ................. | 708/607 |
| 5,291,429 A | * 3/1994 | Iwama et al. ............... | 708/607 |
| 5,311,459 A | * 5/1994 | D'Luna et al. ............. | 708/607 |
| 6,003,058 A | * 12/1999 | Kirschenbaum et al. .... | 708/607 |

* cited by examiner

*Primary Examiner*—David H. Malzahn
(74) *Attorney, Agent, or Firm*—Mayer, Fortkort & Williams, LLC

(57) ABSTRACT

The next generation digital signal processors and reduced instruction set chip processors have multiple arithmetic and logic units and multiply and accumulate units to boost the processor performance. This technique along with higher clock speed of the processors has moved the processor throughput bottle neck to the bus bandwidth. Thus, a bandwidth efficient implementation of standard processing functions is very important to improve the real throughput of these processors. A few processors already use a wide data bus to access multiple consecutive data elements in memory to boost the bus bandwidth. This feature has been used extensively to speed up the cache performance. Disclosed herein is a bandwidth efficient implementation of FIR filter. In any intensive signal processing applications, filters are the basic processing function. The proposed method reduces the required bus bandwidth by about a factor of 2.7 without increasing the number of MAC operations. This can significantly increase the processor real throughput in a RISC type of processor if it is used with an optimum processor architecture. This method can be extended to implement many type of filters, such as a complex filter, a convolution filter, a decimating filter and an adaptive filter.

20 Claims, 3 Drawing Sheets

METHOD AND APPARATUS FOR PERFORMING RAPID CONVOLUTION

BACKGROUND OF THE INVENTION

The present invention relates generally to methods and apparatuses for performing convolution operations, and more particularly to a method and apparatus for performing a convolution operation rapidly.

Convolution operations are performed in many communications devices, such as modems and receivers, in general. Consequently, the speed of these operations has a direct impact on the overall speed of these devices.

Calculating a convolution using direct calculations can be a time consuming, memory hungry operation. In general, for an output block of size N, filter length size M, direct convolution will require 2NM+N memory access to calculate all N outputs. For example, assuming a block size of 48 samples, a filter of length 96, requires 9216 memory accesses for the direct convolution. Reducing the memory accesses will significantly speed up the performance of the processor, such as Digital Signal Processors (DSPs) and Reduced Instruction Set Central Processing Unit (RISC) processors.

The present invention is therefore directed to the problem of developing a method and apparatus for performing a convolution operation rapidly in a processor based device.

SUMMARY OF THE INVENTION

The present invention solves this problem by converting the convolution operation into a commands that function efficiently due to the architecture of the RISC processor. Thus, the present invention provides a technique for performing bandwidth efficient convolution operations, as well as other filtering operations.

DETAILED DESCRIPTION

Figure 1A:
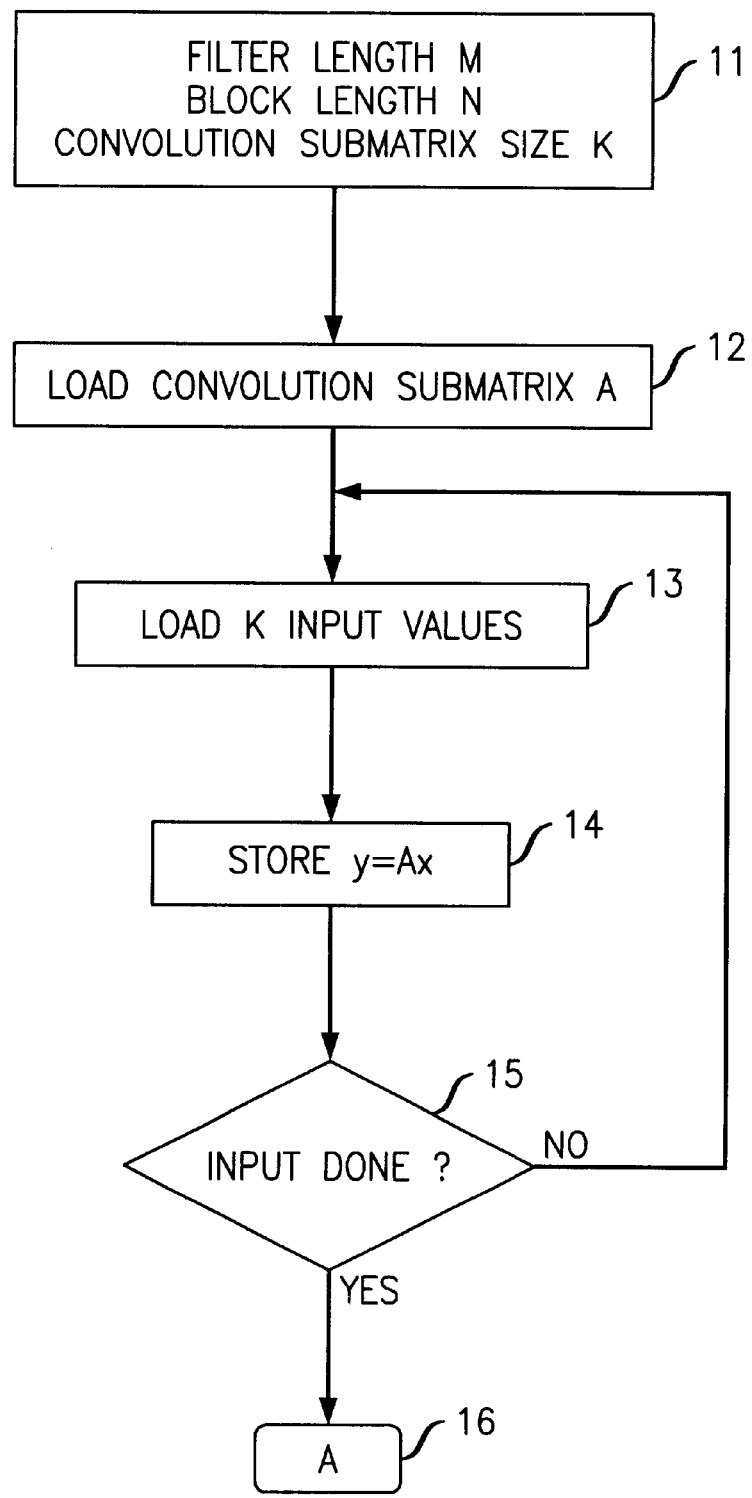
FIGS. 1A–B depict an exemplary embodiment of a method according to the present invention in flow chart format.

The next generation DSPs and RISC processors have multiple arithmetic and logic units (ALU) and multiply and accumulate (MAC) units to boost the processor performance. This technique along with higher clock speed of the processors has moved the processor throughput bottleneck to the bus bandwidth. Thus, a bandwidth efficient implementation of standard processing functions is very important to improve the real throughput of these processors. A few processors already use a wide data bus to access multiple consecutive data elements in memory to boost the bus bandwidth. This feature has been used extensively to speed up the cache performance.

According to the present invention, a bandwidth efficient implementation of a Finite Impulse Response (FIR) filter is now possible. In any intensive signal processing applications, filters are the basic processing function. The proposed method reduces the required bus bandwidth by about a factor of 2.7 without increasing the number of MAC operations. The exemplary method of the present invention can significantly increase the processor real throughput in a RISC type of processor if it is used with an optimum processor architecture. This method can be extended to implement many type of filters as shown by the following examples.

Conventional FIR Implementation

A conventional FIR filter implementation will simply multiply and add all possible combinations of the input and coefficients. For example, a conventional FIR filter implementation is given below.

for (n=0; n<nOutputs; n++) {output(n)=0; for (i=0; i<nCoeffs; i++)
  output(n)+=coeff(i)*input(n+i);
}

The implementation complexity of a conventional filter can be summarized as:

Multiply and accumulate (MAC) operations: nOutputs*nCoeffs Memory read and write operations: 2*nOutputs*nCoeffs+nOutputs It can also be implemented as:

for (n=0; n<nOutputs; n++) output(n)=0;
for (n=0; n<nCoeffs; n++) {
  for (i=0; i<nOutputs; i++)
    output(i)+=coeff(n)*input(n+i);
}

Note: It is assumed that the input and filter coefficients are stored in the reverse order and their sizes are multiples of 4.

Proposed FIR Implementation

Assuming nCoeffs and nOutputs are multiples of 4, and grouping four multiplications, the above implementation can be written as:

for (n=0; n<=nOutputs; n++) output(n)=0;
for (n=0; n<=nCoeffs; n+=4) {
  for (i=0; i<nOutputs; i+=4) { output($i$)+=coeff($n$)*input($n+i$)+coeff($n+1$)*input($n+i+1$)+coeff($n+2$)*input($n+i+2$)+coeff($n+3$)*input($n+i+3$);

output($i+1$)+=coeff($n-1$)*input($n+i$)+coeff($n$)*input($n+i+1$)+coeff($n+1$)*input($n+i+2$)+coeff($n+2$)*input($n+i+3$);

output($i+2$)+=coeff($n-2$)*input($n+i$)+coeff($n-1$)*input($n+i+1$)+coeff($n$)*input($n+i+2$)+coeff($n+1$)*input($n+i+3$);

output($i+3$)+=coeff($n-3$)*input($n+i$)+coeff($n-2$)*input($n+i+1$)+coeff($n-1$)*input($n+i+2$)+coeff($n$)*input($n+i+3$);

}
}

The basic operation is a matrix-vector multiplication. In this implementation, a set of four coefficients are used to process all the inputs, four at a time to get a partial sum of four outputs. This is repeated for all coefficients. The reduction in memory access is obtained by reusing the coefficients. As explained below, this structure is more optimal to increase the processor real throughput than just increasing the number of MAC.

The implementation complexity of an FIR Implementation according to the present invention can be stated as:

Multiply and accumulate (MAC) operations: nOutputs*nCoeffs

Memory read and write operations: ¾*nOutputs*nCoeffs+nCoeffs

Note: It is assumed that 4 memory accesses are required to load the coeff matrix. The matrix needs only 4 new coefficients.

Comparing the above results with that of conventional implementation, one can see that the number of memory access has been reduced by a factor of 2.7 with the same number of MAC.

A RISC machine with a wide internal bus can access multiple data in a single cycle. A special hardware engine can be built to speed up the matrix-vector multiplication. Some of the existing RISC chips support this implementation with memory access of two data elements and matrix-vector multiplication in four cycles. In this processor the number of MAC reduces by a factor of 4 and the memory access by a factor of 2.

An optimum processor can be built with memory access of four data elements in a cycle and matrix-vector multiplication in four cycles. The complexity in this hardware reduces to:

Multiply and accumulate (MAC) operations: ¼*nOutputs*nCoeffs

Memory read and write operations: 3/16*nOutputs*nCoeffs+¼*nCoeffs.

Other Filters

The above implementation can also be used to implement any type of filter. Implementation of complex filters, decimating filters and adaptation in adaptive filters are shown as examples. Others are possible using the technique of the present invention, as would be apparent to those of skill in the art.

COMPLEX FILTERS: Filters with complex inputs and coefficients can be implemented as proposed here by processing two coefficients and outputs.

```
for (n=0; n<nOutputs; n++) {
    outputR(n)=0;
    outputI(n)=0;
}
for (n=0; n<=nCoeffs; n+=2) {
    for (i=0; i<nOutputs; i+=2){ outputR(i)+=coeffR(n)*inputR(n+i)-coeffI(n)*inputI(n+i)+coef-
            fR(n+1)*inputR(n+i+1)-coeffI(n+1)*inputI(n+i+1);

outputI(i)+=coeffI(n)*inputR(n+i)+coeffR(n)*inputI(n+i)+coeffI(n+
            1)*inputR(n+i+1)+coeffR(n+1)*inputI(n+i+1);

outputR(i+1)+=coeffR(n+1)*inputR(n+i)-coeffI(n-1)*inputI(n+i)+
            coeffR(n)*inputR(n+i+1)-coeffI(n)*inputI(n+i+1);

outputI(i+1)+=coeffI(n-1)*inputR(n+i)+coeffR(n-1)*inputI(n+i)+
            coeffI(n)*inputR(n+i+1)+coeffR(n)*inputI(n+i+1);

}
}
```

This can be written in matrix form as:

ADAPTATION: A conventional implementation of filter adaptation is given below.

```
for (n=0; n<nCoeffs; n++) {
    for (i=0, output=0; i<nOutputs; i++)
        output+=error(i)*input(n+i);
    coeff(n)+=scaleFactor*output;
}
```

This can be implemented as follows.

```
for (n=0; n<nCoeffs; n++) {
    output(n)=0;
    for (i=0; i<nOutputs; i++)
        output(n)+=error(i)*input(n+i);
}
for (n=0; n<nCoeffs; n++) coeff(n)+=scaleFactor*output(n);
```

The first part of the processing is similar to an FIR filter and it can be implemented as described above.

DECIMATING FILTER: A conventional decimating FIR filter implementation is given below:

```
for (n=0; n<nOutputs; n++) {
    output(n)=0;
    for (i=0; i<nCoeffs; i++)
        output(n)+=coeff(i)*input(n*decimation+i);
}
```

Using the alternate implementation of an FIR filter and a polyphase structure for multirate filters, this can be implemented as:

```
for (n=0; n<nOutputs; n++)
    output(n)=0;
for (j=0; j<decimation j++) {
    for (n=0; n<nCoeffs; n+=decimation) {
        for (i=0; i<nOutputs; i++)
            output(i)+=coeff(n*decimation+j)*input
                (n*decimation+i+j);
    }
}
```

The above is a parallel implementation of polyphase banks and each banks can be implemented as proposed here. An interpolating filter can also be implemented in an analogous way using a polyphase structure.

Description of Matrix Operations for the Real FIR

The real finite impulse response (FIR) function can be written as follows, where c are the filter coefficients, x are the input samples, and y are the output samples. In this case we are computing a block of output samples.

$$y_i = \sum_{j=0}^{M-1} c_j * x_{i-j} \quad kN \le i < (k+1)N - 1$$

This can be expressed in matrix form using the convolution matrix.

| outputR(i)   | coeffR(n)    | −coeffI(n)    | coeffR(n + 1) | −coeffI(n + 1) | inputR(n + i)     |
| outputI(i)   | coeffI(n)    | coeffR(n)     | coeffI(n + 1) | coeffR(n + 1)  | inputI(n + i)     |
| outputR(i + 1) | coeffR(n − 1) | −coeffI(n − 1) | coeffR(n)    | −coeffI(n)     | inputR(n + i + 1) |
| outputI(i + 1) | coeffI(n − 1) | coeffR(n − 1) | coeffI(n)    | coeffR(n)      | inputI(n + i + 1); |

$$\begin{bmatrix} y_{kN} \\ y_{kN+1} \\ \vdots \\ y_{(k+1)N-1} \end{bmatrix} = \begin{bmatrix} \overbrace{\begin{matrix} c_{M-1} & c_{M-2} & c_{M-3} & c_{M-4} \\ 0 & c_{M-1} & c_{M-2} & c_{M-3} \\ 0 & 0 & c_{M-1} & c_{M-2} \\ 0 & 0 & 0 & c_{M-1} \end{matrix}}^{\text{Convolution submatrix}} & \begin{matrix} c_0 & 0 & 0 & 0 \\ c_1 & c_0 & 0 & 0 \\ c_2 & c_1 & c_0 & 0 \\ c_3 & c_2 & c_1 & c_0 \end{matrix} & \cdots \\ & & \ddots \\ & \begin{matrix} c_0 & 0 & 0 & 0 \\ c_1 & c_0 & 0 & 0 \\ c_2 & c_1 & c_0 & 0 \\ c_3 & c_2 & c_1 & c_0 \end{matrix} \end{bmatrix} \begin{bmatrix} x_{kN-M} \\ x_{kN-M+1} \\ \vdots \\ x_{kN} \end{bmatrix}$$

Note: in above equation the x vector subscripts should range from $x_{kN-M+1}$ to $x_{(k+1)N-1}$ We can provide a more efficient implementation that minimizes data transfers by recognizing that the diagonal convolution submatrices are identical. The computation of the output samples can then be accomplished by accumulating partial sums of products generated from a single convolution submatrix. This can be expressed as an equation for submatrix size 4×4 as follows.

$$\tilde{x}_{ij} = \begin{bmatrix} x_{i-M+4j} \\ x_{i-M+4j+1} \\ x_{i-M+4j+2} \\ x_{i-M+4j+3} \end{bmatrix} \quad \tilde{A}_j = \begin{bmatrix} c_{M-4j} & c_{M-4j-1} & c_{M-4j-2} & c_{M-4j-3} \\ c_{M-4j+1} & c_{M-4j} & c_{M-4j-1} & c_{M-4j-2} \\ c_{M-4j+2} & c_{M-4j+1} & c_{M-4j} & c_{M-4j-1} \\ c_{M-4j+3} & c_{M-4j+2} & c_{M-4j+1} & c_{M-4j} \end{bmatrix}$$

$$\tilde{y}_i = \begin{bmatrix} y_i \\ y_{i+1} \\ y_{i+2} \\ y_{i+3} \end{bmatrix}$$

where $$\tilde{y}_i = \sum_{j=0}^{M/4} \tilde{A}_j \tilde{x}_{ij}$$

We require the same number of multiply-accumulates using the direct convolution and the submatrix convolution described above. However, consider the number of data transfers required in each case. For the direct convolution, we require 16 fetches for x and y for 16 multiply-accumulates, or a total of 32 memory references. For the submatrix implementation, after loading the convolution submatrix, we require 4 fetches for the x matrix, 4 fetches of the previous sum of products, and four writes of the new sums of products, or a total of 12 memory operations. Since the submatrix is used over all groups of four outputs for the entire output block before being reloaded, these memory transfers are minimal compared to the transfer of input data and partial sums of products for typical output block sizes. In general, for an output block of size N, filter length size M, and submatrix size K, direct convolution will require 2NM+N memory access to calculate all N outputs. Using the submatrix technique requires M+(3NM/K) memory accesses, including coefficient loads. For example, assuming a block size of 48 samples, a filter of length 96, and a submatrix of size 4×4, we will require 9216 memory accesses for the direct convolution and 3552 for the submatrix technique, or 2.59 times as many memory accesses for the direct technique.

Figure 1B:
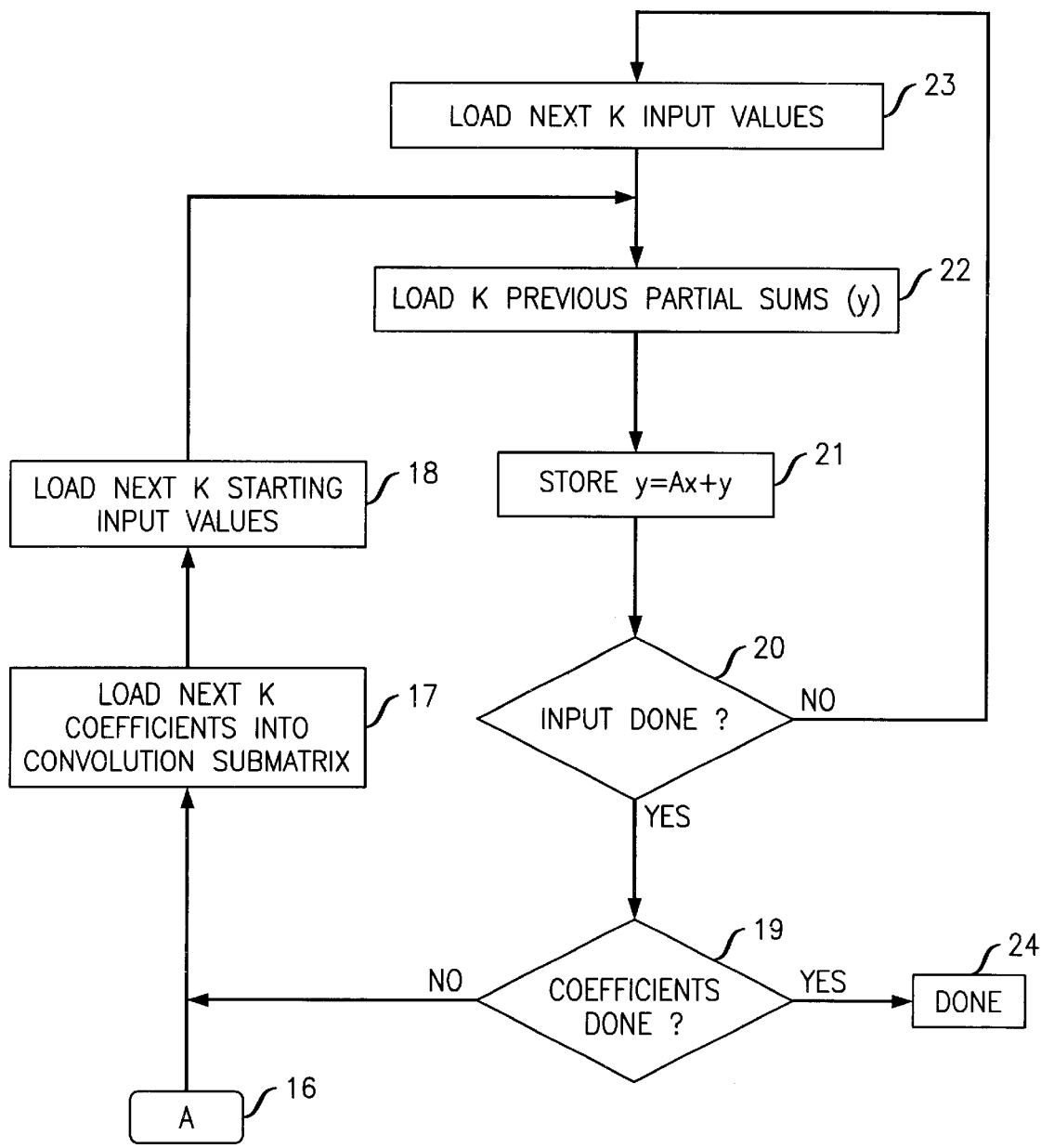

FIGS. 1A–B depict in flow chart format an exemplary method of the convolution submatrix technique according to the present invention.

First, in step 11, the filter length M and the block length N and the convolution submatrix size K are selected.

Next, the process moves to step 12, in which the convolution submatrix A is loaded.

The process then moves to step 13, in which the K input values are loaded.

Next, the process moves to step 14, and stores the equation in memory.

Next, the process moves to step 15, in which the program tests if the first part of the process is complete. In other words, is there any data left in the block. If the first part of the process is not complete, i.e., there remains data in the block, then the process returns to step 13, and repeats steps 13 through 15. If there is no data left in the block, hence the first part of the process is complete, then the process moves to step 16, which depicts the interconnection between FIG. 1A and FIG. 1B.

Referring now to FIG. 1B, the process moves from step 16 to step 17. In this step 17, the next k coefficients are loaded into the convolution submatrix.

Next, the process moves to step 18, in which the next K starting input values are loaded.

Then, the process moves to step 22, in which the K previous partial sums (y) are loaded.

The process then moves to step 21, in which the values are stored in memory.

In step 20, the process tests to determine if the input is done. If the input is done, the process moves to step 19, if not the process moves to step 23. In step 23, the next K input values are loaded. The process then repeats steps 22, 21 and 20, in that order. If the input is done, the process moves to step 19.

In step 19, the process tests to determine if the coefficients are done. If the coefficients are done, the process is complete (step 24). If the coefficients are not done, the process moves to step 17 and repeats steps 17, 18, 22, 21, 20 (steps 23, 22, 21 and 20, as many times as necessary) and 19, as many times as necessary.

Figure 2:
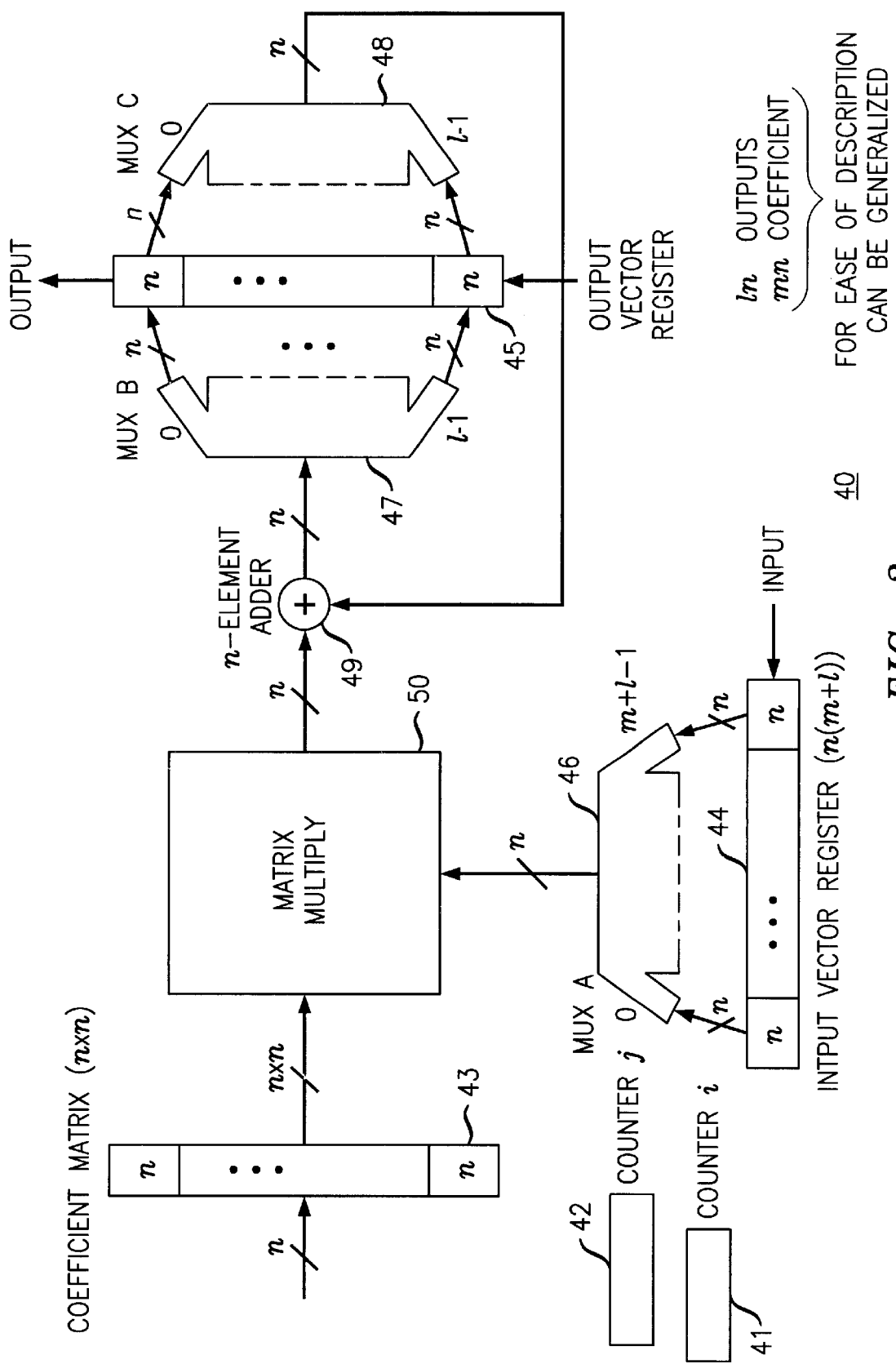
FIG. 2 depicts an exemplary embodiment of an apparatus for performing the method depicted in FIGS. 1A–B.

Referring to FIG. 2, shown therein is a block diagram of an apparatus 40 for performing the method of the present invention discussed above. The apparatus includes two counters (41, 42); three registers (43, 44 and 45), one for the coefficients (43), a second for the input (44), and a third for the output (45); three multiplexers (46, 47, and 48); an n-element adder 49, and a matrix multiplier (50).

The first counter 41 maintains the index i, which runs from zero (0) to l. The second counter 42 maintains the index j, which runs from zero (0) to m.

The coefficients are stored in coefficient register 43, which stores the nHn matrix of coefficients. The coefficients are loaded into the coefficient register at the beginning of the convolution operation. The input line is an n-bit wide input.

The matrix multiplier 50 performs the non matrix multiplication. The matrix multiplier 50 is coupled to the coefficient register 43 by an nHn-bit wide line.

The adder 49 is an n-element adder that adds the output of the matrix multiplier 50 and the output of the multiplexer 48. Thus, the adder 49 is coupled to the matrix multiplier 50 and the multiplexer 48 by n-bit wide lines.

The output of the convolution operation is stored in output register 45. The output is clocked out at the end of the operation, as partial values are stored in the output register during the successive steps of the process. As shown in the exemplary embodiment, the output can be clocked out serially, however, the same output could be clocked out in parallel, as would be apparent to those of skill in the art. Each n-bit segment of the output register receives its input from one of the outputs of the multiplexer 47 via an n-bit wide line. Each n-bit segment of the output register is coupled to one of the inputs of the multiplexer 48 via an n-bit wide line.

The input to the convolution operation is stored in register 44, which is n(m+l)-bits long. The input is clocked into the input register 44 serially, as depicted in FIG. 2, however, it could also be loaded in parallel, as would be apparent to those of skill in the art.

Multiplexer 46 converts the inputs, which are n(m+l)-bits long to a parallel output. Each n-bit segment of the input register 44 is coupled to one input of multiplexer 46. The output is a single n-bit segment, which is coupled to the matrix multiplier 50 via an n-bit wide line.

Multiplexer 47 converts the output of the n-element adder 49, which is n-bits long to a parallel output. Each output of the multiplexer 47 is coupled to one n-bit segment of the output register via an n-bit wide line.

Multiplexer 48 converts the outputs, which are ln-bits long to a parallel output. Each input of the multiplexer 48 receives an n-bit segment from the output register 45 via an n-bit wide line.

The apparatus 40 operates as follows.

Step 1: Counter 42 (the j counter) is initialized to zero.

Step 2: The ln input values are shifted (e.g., serially) into the input register 44. The input register is coupled by m+l n-bit lines to the multiplexer 46, which converts the input to a parallel line of n-bits and m+l−1 bits deep. The output of the multiplexer 46 is coupled to the matrix multiplier 50 via a single n-bit wide line. The other input of the matrix multiplier 50 is coupled to the coefficient register 43 by an ne-bit wide line.

Step 3: The output vector register 45 is zeroed to be ready to accept the output bits.

Step 4: The coefficient register 43 is loaded (e.g., in parallel) with the coefficients, which are n×n-bits.

Step 5: The output of the coefficient register 43 is then coupled to the matrix multiplier 50 by an n×n-bit wide line.

Note: The counter 42 runs from j=0 to j<m while the other counter 41 runs from j=0 to i<l.

Step 6: Counter 41 is zeroed (i=0).

Step 7: The j+i input of multiplier 46 is selected.

Step 8: The matrix multiplication is performed by matrix multiplier 50.

Step 9: The multiplexer input i from multiplexers 47 and 48 are selected.

Step 10: The n-element add of the matrix product is performed by adder 49.

Step 11: The n output partial products are loaded into the output vector register 45 at location i.

Step 12: The counter 41 for i is incremented by one, and the process returns to step 7 and repeats steps 7 through 12 as long as counter 41 remains such that i<l. Once counter 41 exceeds l (i.e., i>l), the process continues with step 13.

Step 13: The n-input coefficients are loaded into the coefficient matrix 43.

Step 14: The coefficient matrix is shifted.

Step 15. The counter 42 for j is incremented by one, and the process returns to step 6 and repeats steps 6 through 15 as long as counter 42 remains such that j<m. Once counter 42 exceeds m (i.e., j>m), the process ends, and the output is shifted out of register 45.

While the present invention has been described using the above exemplary embodiments, the scope of the present invention is defined by the claims as follows.

What is claimed is:

1. A method for performing a convolution operation on incoming data comprising the steps of:

a) formatting the incoming data into a plurality of blocks, each of said plurality of blocks having a length equal to N bits;

b) defining a convolution submatrix A having a length of K bits, wherein K<N;

c) loading the convolution submatrix A with a plurality of K input bits from one of the plurality of blocks of N bits and loading a vector x with K input values;

d) calculating and storing a result of the following matrix calculation:

$$y=Ax;$$

wherein y represents output samples;

e) repeating steps c) through d) until all input values have been processed;

f) loading a plurality of next K input bits from a next one of the plurality of blocks of N bits the convolution sub matrix A;

g) loading a plurality of K input values into the vector x;

h) loading previous partial sums (y), now defined as y(previous), calculated in step d);

i) calculating and storing a result of the following matrix equation;

$$y(\text{new})=Ax+y(\text{previous});$$

j) repeating steps g) through i) using successive ones of groups of K input values until all input values have been processed; and k) repeating steps f) through j) until all of the plurality of blocks of N bits have been processed.

2. A method for performing a finite impulse response filter operation on a plurality of inputs using a plurality of coefficients comprising the steps of:

a) defining a maximum number of the plurality of coefficients and a maximum number of a plurality of outputs, both of which are multiples of four;

b) setting a first counter (n) equal to zero;

c) setting a second counter (i) equal to zero;

d) calculating four equations as below:

$$\text{output}(i)=\text{coeff}(n)*\text{input}(n+i)+\text{coeff}(n+1)*\text{input}(n+i+1)+\text{coeff}(n+2)*\text{input}(n+i+2)+\text{coeff}(n+3)*\text{input}(n+i+3) \quad \text{(equation 1)};$$

$$\text{output}(i+1)=\text{coeff}(n-1)*\text{input}(n+i)+\text{coeff}(n)*\text{input}(n+i+1)+\text{coeff}(n+1)*\text{input}(n+i+2)+\text{coeff}(n+2)*\text{input}(n+i+3) \quad \text{(equation 2)};$$

$$\text{output}(i+2)=\text{coeff}(n-2)*\text{input}(n+i)+\text{coeff}(n-1)*\text{input}(n+i+1)+\text{coeff}(n)*\text{input}(n+i+2)+\text{coeff}(n+1)*\text{input}(n+i+3) \quad \text{(equation 3)};$$

$$\text{output}(i+3)=\text{coeff}(n-3)*\text{input}(n+)+\text{coeff}(n-2)*\text{input}(n++1)+\text{coeff}(n-1)*\text{input}(n+i+2)+\text{coeff}(n)*\text{input}(n+i+3) \quad \text{(equation 4)},$$

wherein coeff(n) is an nth coefficient of the plurality of coefficients and input(n) is an nth input of the plurality of inputs;

e) incrementing the second counter (i) by four and repeating step d) until the second counter (i) exceeds said maximum number of the plurality of outputs; and f) incrementing the first counter (n) by four and repeating steps c) through e) until the first counter (n) exceeds said maximum of the plurality of coefficients.

3. A method for calculating a plurality of outputs of a convolution operation on a plurality of inputs comprising the steps of:

a) performing a matrix-vector multiplication in which a set of four coefficients of a plurality of coefficients is used to process all inputs, four at a time, to derive a partial sum of four outputs;

b) repeating step a) for a next set of four coefficients until all coefficients of the plurality of coefficients are processed and updating the partial sum each time; and c) reusing the set of four coefficients in each successive calculation in step a).

4. In a reduced instruction set processor having a wide internal bus, whereby the processor can access multiple data in a single cycle, said processor performing a memory access of two data elements (inputR(n)) and inputI(n)) and a matrix-vector multiplication in four cycles, a method for performing a complex filter operation using a plurality of real coefficients (coeffR(n)) and a plurality of imaginary coefficients (coeffI(n)), comprising the steps of:

a) defining a plurality of real outputs (ouput(R(i)) and a plurality of imaginary outputs (outputI(i));

b) setting a first counter (n) to zero;

c) setting a second counter (i) equal to zero;

d) calculating the following equations:

$$\text{output}R(i)=\text{coeff}R(n)*\text{input}R(n+i)-\text{coeff}I(n)*\text{input}I(n+i)+\text{coeff}R(n+1)*\text{input}R(n+i+1)-\text{coeff}I(n+1)*\text{input}I(n+i+1);$$

$$\text{output}I(i)=\text{coeff}I(n)*\text{input}R(n+i)+\text{coeff}R(n)*\text{input}I(n+i)+\text{coeff}I(n+1)*\text{input}R(n+i+1)+\text{coeff}R(n+1)*\text{input}I(n+i+1);$$

$$\text{output}R(i+1)=\text{coeff}R(n-1)*\text{input}R(n+i)-\text{coeff}I(n-1)*\text{input}I(n+i)+\text{coeff}R(n)*\text{input}R(n+i+1)-\text{coeff}I(n)*\text{input}I(n+i+1);$$

$$\text{output}I(i+1)=\text{coeff}I(n-1)*\text{input}R(n+i)+\text{coeff}R(n-1)*\text{input}I(n+i)+\text{coeff}I(n)*\text{input}R(n+i+1)+\text{coeff}R(n)*\text{input}I(n+i+1);$$

e) incrementing the second counter by two and repeating step d) until the second counter exceeds a predetermined number; and f) incrementing the first counter by two and repeating steps c) through e) until the first counter exceeds a number of the plurality of real coefficients or the plurality of imaginary coefficients.

5. In a reduced instruction set processor having a wide internal bus, whereby the processor can access multiple data in a single cycle, said processor performing a memory access of two data elements and a matrix-vector multiplication in four cycles, a method for performing a filter adaptation operation to determine a plurality of coefficients, said filter adaptation operation using an error signal and a scaleFactor to determine the plurality of coefficients, comprising the steps of:

a) setting a first counter (n) to zero;

b) setting a second counter (i) equal to zero;

c) calculating the following equation:

$$\text{output}(i)=\text{error}(i)\times\text{input}(n+i);$$

d) incrementing tie second counter (i) and repeating step d) until the second counter (i) exceeds a predetermined number of outputs;

e) incrementing the first counter (n) and repeating steps b) through d) until the first counter (n) exceeds a number of the plurality of coefficients;

f) setting a third counter (k) to zero;

g) calculating the following equation:

$$\text{coeff}(k)=\text{scaleFactor}\times\text{Output}(k),$$

wherein coeff(k) is a kth coefficient of the plurality of coefficients; and h) incrementing the third counter (k) and repeating step g) until the third counter (k) exceeds the number of the plurality of coefficients.

6. In a reduced instruction set processor having a wide internal bus, whereby the processor can access multiple data in a single cycle, said processor performing a memory access of two data elements and a matrix-vector multiplication in four cycles, a method for performing a decimating filter operation on a plurality of inputs using a plurality of coefficients and a decimating value, comprising the steps of:

a) setting a first (j) counter to zero;

b) setting a second counter (n) equal to zero;

c) setting a third counter (i) equal to zero;

d) calculating the following equation:

$$\text{output}(i)=\text{coeff}(n\times d+j)\times\text{input}(n\times d+i+j),$$

wherein coeff(n) is an nth coefficient of the plurality of coefficients, d is the decimating value, input (n) is an nth input of the plurality of inputs, and output(i) is an ith output of a plurality of outputs;

e) incrementing the third counter (i) and repeating step d) until the third counter (i) exceeds a number of the plurality of outputs;

f) incrementing the second counter (n) and repeating steps c) through e) until the second counter (n) exceeds a number of the plurality of coefficients; and g) incrementing the first counter (j) and repeating steps b) through f) until the first counter (j) exceeds the decimating value.

7. An apparatus for performing a convolution operation comprising:

a) a matrix multiplier receiving as a fist input an n×n-bit coefficient and receiving as a second input an n-bit wide signal;

b) an n-element adder coupled to the matrix multiplier and receiving an n-bit wide output from the matrix multiplier as a first input and a second input being n-bits wide, and having an output being n-bits wide;

c) a first multiplexer being coupled to the output of the n-element adder and converting an nl-bit input to a plurality of l outputs, each of which are n bits;

d) an output register having nl bits and having l inputs, each being n-bits wide, said l inputs being coupled to the first multiplexer and l outputs, each being n-bits wide; and e) a second multiplexer having l inputs each being n-bits wide, said l inputs being coupled to the l outputs of the output register and converting the ln inputs to a single output being n-bits wide, said single output being coupled in feedback fashion to the second input of the n-element adder.

8. The apparatus according to claim 7, further comprising:
a) an input register receiving an n(m+l)-bit wide input signal, and having a plurality of m+l outputs, each being n-bits wide; and
b) a third multiplexer having a plurality of m+l inputs being coupled to the plurality of m+l outputs of the input register, each of the plurality of m+l inputs being n-bits wide, and having a single output being coupled to the second input of the matrix multiplier, which second input is n-bits wide.

9. The apparatus according to claim 7, further comprising a first counter maintaining a count value from zero to m.

10. The apparatus according to claim 9, further comprising a second counter maintaining a count value from zero to l.

11. The apparatus according to claim 10, further comprising a coefficient register receiving an n×n-bit coefficient signal as an input and having an n×n-bit output being coupled to the first input of the matrix multiplier.

12. The apparatus according to claim 11, wherein:
a) the first counter is initialized to zero;
b) ln input values are shifted into the input register;
c) the output register is zeroed;
d) the coefficient register is loaded with the coefficients;
e) the output of the coefficient register is then coupled to the matrix multiplier;
f) the second counter is zeroed;
g) the j+ith input of the third multiplexer is selected; and
h) a matrix multiplication is performed by the matrix multiplier.

13. A method for performing a convolution operation comprising the steps of:
a) initializing a first counter;
b) shifting a plurality of ln input values into an input register;
c) initializing an output register,
d) loading a coefficient register with a plurality of coefficients;
e) initializing a second counter;
i) selecting a j+ith input of a first multiplexer;
g) performing a matrix multiplication;
h) selecting ith inputs from a second and third multiplexers;
i) performing an n-element addition of the matrix product and an output of the third multiplexer;
j) loading n output partial products into the output register at location i; and
k) incrementing the second counter by one, and returning to step f) and repeating steps f) through k) as long as the second counter remains such that i<l, wherein once the second counter exceeds l (i.e., i>l), continuing with step 1);
l) loading n-input coefficients into the coefficient matrix register;
m) shifting the coefficient matrix register; and
n) incrementing the first counter by one, and returning to step e) and repeating steps e) through n) as long as the first counter remains such the j<m, wherein once the first counter exceeds m (i.e., j>m), and shifting an output of the output register.

14. An apparatus for performing a convolution operation comprising:
a) means for performing a matrix multiplication, said matrix multiplication means receiving as a first input an n×n-bit coefficient and receiving as a second input an n-bit wide signal;
b) means for performing an n-element addition, said n-element addition means coupled to the matrix multiplication means and receiving an n-bit wide output from the matrix multiplication means as a first input and having a second input being n-bits wide, and having an output being n-bits wide;
c) first multiplexer means being coupled to the output of the n-element addition means and converting an nl-bit input to l outputs, each of which is n bits wide;
d) a first storage means storing nl bits and having l inputs, each being n-bits wide, said l inputs being coupled to the first multiplexer means and l outputs, each being n-bits wide; and
e) a second multiplexer means having l inputs, each being n-bits wide, said l inputs being coupled to the l outputs of the first storage means and converting the ln inputs to a single output being n-bits wide, said single output being coupled in feedback fashion to the second input of the n-element addition means.

15. The apparatus according to claim 14, further comprising:
a) a second stage means receiving an n(m+l)-bit wide input signal, arid having a plurality of m+l outputs, each being n-bits wide; and
b) a third multiplexer means having a plurality of m+l inputs being coupled to the plurality of m+l outputs of the second storage means, each of the plurality of m+l inputs being n-bits wide, and having a single output being coupled to the second input of the matrix multiplication means, which second input is n-bits wide.

16. The apparatus according to claim 15, further comprising a first counting means maintaining a count value from zero to m.

17. The apparatus according to claim 16, further comprising a second counting means maintaining a count value from zero to l.

18. The apparatus according to claim 17, further comprising a third storage means receiving an n×n-bit coefficient signal as an input and having an n×n-bit output being coupled to the first input of the matrix multiplication means.

19. The apparatus according to claim 18, wherein:
a) the first counting means is initialized to zero;
b) ln input values are shifted into the second storage means;
c) the first storage means is zeroed;
d) the third storage means is loaded with the coefficients;
e) the output of the third storage means is then coupled to the matrix multiplication means;
f) the second counting means is zeroed;
g) the j+ith input of the third multiplexer means is selected;
h) a matrix multiplication is performed by the matrix multiplication means;
i) the ith inputs from the first and second multiplexer means are selected;

j) an n-element addition of the matrix product is performed by the n-element addition means;
k) the n output partial products are loaded into the first storage means and location i;
l) the second counting means is incremented by one, and the process returns to step g) and repeats steps g) through l) as long as the second counting means remains such that i<l, wherein once the second counting means exceeds l, the process continues with step m);
m) the n-input coefficients are loaded into the third storage means;
n) the third storage means is shifted; and
o) the first counting means is incremented by one, and the process returns to step f) and repeats steps f) through o) as long as the first counting means remains such that j<m, wherein once the first counting means exceeds m, the process ends, and the output is shifted out of the first storage means.

20. An apparatus for performing a convolution operation comprising:
a) a first counter counting a first integer value j;
b) an input register receiving a plurality of jn input values;
c) an output register;
d) a coefficient register receiving a plurality of coefficients;
e) a second counter counting a second integer value i;
f) a first multiplexer having a plurality of inputs and outputting a j+ith input;
g) means for performing a matrix multiplication;
h) a second multiplexer having a plurality of inputs and outputting an ith input;
i) a third multiplexer having a plurality of inputs and outputting an ith input;
j) means for performing an n-element addition of a matrix product and an output of the third multiplexer;
k) an output register having a plurality of locations and receiving n output partial products at location i;
l) wherein said second is incremented by one and said first multiplexer, said matrix multiplication means, said second multiplexer, said third multiplexer, said n-element adding means and said output register continue to perform their functions as long as the second counter remains such that i<j, wherein once the second counter exceeds j said first multiplexer, said matrix multiplication means, said second multiplexer, said third multiplexer, said n-element adding means and said output register stop performing their functions;
wherein said coefficient matrix register receives n-input coefficients, said coefficient matrix register is shiftable in accordance with the first counter, and said first counter is incremented by one and said first multiplexer, said matrix multiplication means, said second multiplexer, said third multiplexer, said n-element adding means and said output register start their functions again as long as the first counter remains such that i<n, and once the first counter exceeds n an output of the output register is shifted out.

* * * * *